(12) United States Patent
Relander et al.

(10) Patent No.: US 9,088,610 B2
(45) Date of Patent: Jul. 21, 2015

(54) METHOD AND APPARATUS FOR COMMUNICATIONS ACCELERATOR ON CIP MOTION NETWORKS

(75) Inventors: Randi J. Relander, Chaska, MN (US); Arun K. Guru, Germantown, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 524 days.

(21) Appl. No.: 12/241,778

(22) Filed: Sep. 30, 2008

(65) Prior Publication Data
US 2010/0082837 A1 Apr. 1, 2010

(51) Int. Cl.
*G06F 15/173* (2006.01)
*H04L 29/06* (2006.01)

(52) U.S. Cl.
CPC .............. *H04L 69/16* (2013.01); *H04L 69/161* (2013.01)

(58) Field of Classification Search
USPC ........................................................ 709/233
See application file for complete search history.

(56) References Cited

U.S. PATENT DOCUMENTS

| | | | | |
|---|---|---|---|---|
| 5,276,893 A * | 1/1994 | Savaria | ............................ | 714/10 |
| 5,636,358 A * | 6/1997 | Brant et al. | .................... | 711/117 |
| 5,638,370 A * | 6/1997 | Seconi et al. | ................. | 370/466 |
| 6,449,658 B1 * | 9/2002 | Lafe et al. | ..................... | 709/247 |
| 6,760,782 B1 * | 7/2004 | Swales | .......................... | 709/250 |
| 6,963,922 B2 * | 11/2005 | Papadopoulos et al. | ....... | 709/230 |
| 7,386,705 B2 * | 6/2008 | Low et al. | ........................ | 712/34 |
| 7,424,419 B1 * | 9/2008 | Fike et al. | ....................... | 703/23 |
| 7,716,403 B2 * | 5/2010 | Hall | .............................. | 710/106 |
| 7,725,528 B1 * | 5/2010 | Zink et al. | ..................... | 709/203 |
| 2001/0004354 A1 * | 6/2001 | Jolitz | ............................ | 370/328 |
| 2004/0024915 A1 * | 2/2004 | Abe | ............................... | 709/250 |
| 2004/0230795 A1 * | 11/2004 | Armitano et al. | ............. | 713/165 |
| 2005/0228891 A1 * | 10/2005 | Itoh et al. | ...................... | 709/228 |
| 2005/0228899 A1 * | 10/2005 | Wendkos et al. | ............. | 709/232 |
| 2006/0022035 A1 * | 2/2006 | Shinkai | ......................... | 235/383 |
| 2006/0155865 A1 * | 7/2006 | Brandt et al. | ................. | 709/230 |
| 2006/0209868 A1 * | 9/2006 | Callaghan | ..................... | 370/428 |
| 2007/0005158 A1 * | 1/2007 | Nicolson et al. | ................ | 700/69 |
| 2007/0124443 A1 * | 5/2007 | Nanda et al. | .................... | 709/223 |
| 2007/0226318 A1 * | 9/2007 | Rydberg et al. | ............... | 709/218 |
| 2009/0055569 A1 * | 2/2009 | Maheshwari et al. | ........ | 710/311 |

* cited by examiner

*Primary Examiner* — Andrew Goldberg
(74) *Attorney, Agent, or Firm* — Quarles & Brady LLP (57) ABSTRACT

An apparatus for accelerating communications over the Ethernet between a first processor and a second processor where the communications include CIP messages, the apparatus comprising a network accelerator that includes memory locations, the accelerator associated with the first processor and programmed to, when the second processor transmits a data packet to the first processor over the Ethernet, intercept the data packet at a first processor end of the Ethernet, extract a CIP message from the data packet, parse the CIP message to generate received data, store the received data in the memory locations and provide a signal to the first processor indicating that data for the first processor in stored in the memory locations.

9 Claims, 6 Drawing Sheets

METHOD AND APPARATUS FOR COMMUNICATIONS ACCELERATOR ON CIP MOTION NETWORKS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to methods and apparatus for accelerating communication processes in industrial controls and more specifically to methods and apparatus for substantially reducing the time required to process common industrial protocol (CIP) network communications in motion control applications.

Industrial programmable logic controllers (PLCs) are special purpose processing devices used for controlling/monitoring automated and semi-automated industrial processes, machines, manufacturing equipment, plants, and the like. A typical PLC executes a control program or routine in order to track process variables or inputs representative of the status of controlled processes/machines and to generate outputs for controlling the processes/machines.

In distributed control systems, the process control tasks are distributed among several different controllers/processors, each of which performs different control functions. For instance many control systems include one or more main PLCs and distributed device processors where, as the label implies, individual device control and monitoring is accomplished using the distributed device processors and overall system control and coordination is handled by the PLCs. Thus, for example, a complex control system may include one or more PLCs and several hundred device processors linked to the PLCs via a communication network. An exemplary device processor may include a controller for a motor drive that runs complex control algorithms to control motor speed, acceleration, deceleration, torque and so on as a function of various motor and other operating parameters monitored by the device processor directly and/or parameters associated with other motors or sensors at other system stations.

Various communication protocols have been developed to facilitate communication between remotely located network devices (e.g., PLCs, distributed device processors, and the like). For instance, IEEE 802.3 Ethernet is traditionally an office networking protocol that has gained universal acceptance world-wide. Ethernet is an open standard supported by many manufacturers and its infrastructure equipment is widely available and largely installed. Likewise, Ethernet's Transmission Control Protocol and Internet Protocol (TCP/IP) is ubiquitous as TCP/IP comprises the basic transport and network layer protocol of the internet that commonly links all Ethernet installations world-wide. The primary function of TCP is to allow blocks of binary data to be exchanged between computers and to ensure that all packets of data transmitted are received correctly, while IP makes sure that messages/data packets are correctly addressed and routed. Thus, TCP/IP does not define what the data means or how the data is to be interpreted. Instead, TCP/IP it is merely a transport and network protocol. User-Datagram Protocol/IP (UDP/IP) is another transport layer protocol that is responsible for ensuring prompt delivery of a data packet.

TCP/IP and UDP/IP are actually formed from suites of protocols upon which all internet communication is based. The suites of protocols are also referred to as protocol stacks and each data sending or receiving device (e.g., PLC, device processor, etc.) linked to internet must run separate protocol stacks. The use of the word stack refers to the simplified TCP/IP or UDP/IP layered reference model or stack that is used to design network software.

Each layer on a sending stack (i.e., a stack maintained by a device that sends a message on the network) communicates with the corresponding layer of the receiving stack (i.e., a stack maintained by a device that receives a message) through information stored in communication packet headers. As data is moved down the stack of the sending device, each stack layer adds its own header to the front of the message that it receives from the next higher layer. That is, the higher layers are encapsulated by the lower layers. Conversely, this header information is removed by the corresponding layer at the receiving device. In this way, the headers are essentially peeled off as the data packet moves up the stack of the receiving device to a receiver application.

For many years, the Common Industrial Protocol/Control and Information Protocol (CIP) has been widely used in industrial environments to provide both real-time and informational message functionality. Unlike TCP/IP and UDP/IP which are transport layer protocols, CIP is an application protocol and is essentially a messaging structure which defines rules for organizing and interpreting data. CIP is freely available, accessible to anyone, easy to understand and widely supported by many manufacturers of industrial equipment. For these reasons CIP has been used to building other industrial communication standards such as DeviceNet and ControlNet.

EtherNet/Industrial Protocol (EtherNet/IP) merges traditional IEEE 802.3 Ethernet with the CIP as its application layer to build a powerful industrial communication standard. EtherNet/IP shares the same physical and data link layers of traditional IEEE 802.3 Ethernet and uses the same TCP/IP and UDP/IP suites of protocols which makes EtherNet/IP fully compatible with existing Ethernet hardware, such as cables, connectors, network interface cards, hubs and switches. Since EtherNet/IP uses the same application layer protocol (i.e., CIP) used by both DeviceNet and ControlNet, EtherNet/IP, DeviceNet and ControlNet share common device profiles and object libraries which enables Ethernet, DeviceNet and ControlNet devices to communicate over the same network.

Thus, EtherNet/IP uses TCP/IP, UDP/IP, and Ethernet to carry the data of the CIP message structure between devices. That is, EtherNet/IP combines a physical network (Ethernet), with a networking standard (TCP/IP & UDP/IP) and a standard method of representing data (CIP).

Thus, in a distributed control system that includes a PLC and a distributed device processor where the PLC and device processor communicate using EtherNet/IP, when the PLC sends data (e.g., informational or control) to the device processor, the PLC packages the data into a CIP packet and passes the CIP packet down the PLC sender stack to generate an EtherNet/IP packet which is then transmitted to the device processor. When the device processor receives the EtherNet/IP packet, the device processor removes the header information to extract the CIP message and uses the CIP data in the device application. Similarly, when the device processor sends data to the PLC, the device processor packages the data into a CIP packet and passes the CIP packet down the distributed device sender stack to generate an EtherNet/IP packet which is then transmitted to the PLC which, upon receiving the EtherNet/IP packet, removes the header information to extract the CIP message.

In control applications generally and in motion control applications specifically, it is extremely important that control commands be distributed among distributed processors and PLCs extremely quickly to avoid uncontrolled system conditions. Here, the phrase "motion I/O connection processing time" is used to refer to the time required for a processor to receive an EtherNet/IP packet, remove packet headers to extract a CIP packet, extract data from the CIP packet, deliver the extracted data to an application, obtain data from the application, package the obtained data in a CIP packet, package the CIP packet in an EtherNet/IP packet, and transmit the EtherNet/IP packet onto the internet.

Currently motion control communications speed requirements leave about insufficient time for motion I/O connection processing (i.e., the time required to pack or unpack an EtherNet/IP-CIP packet) and this time will likely be reduced in the future as more stringent regulations are adopted by the industrial automation industry. While PLCs typically have plenty of processing power to handle communication tasks (i.e., packing and unpacking command data, informational data, etc.) within required processing times and still perform other required functions, unfortunately, tests have shown that distributed device processors that have to perform other control processes (e.g., motor control) often fail to meet the motion I/O connection processing time requirements.

One solution for dealing with distributed device processors that cannot meet motion I/O connection processing time requirements would be to redesign all device processors to have L2 cache which would remove the memory bottleneck and allow stack performance to be scaled directly with clock speed. This solution has several shortcomings. First, this solution would be particularly expensive as higher performance processors having L2 cache are generally more expensive than existing processors that have L1 cache. Additional overall system expense could render these types of systems unsuitable for certain applications.

Second, device processor suppliers may view EtherNet/IP as an evolving technology and not want to invest in developing new higher performing processors for an unproven market. This is especially true where suppliers will continue to have to provide current lower performing device processors for some time to support existing clients and systems and may not want to carry two different processors for different needs.

Third, this solution will likely be impractical for a long time as customers may perceive that current systems suffer in performance. To this end, where EtherNet/IP is used for motion control, all device processors that are to facilitate motion control within a system would have to be the high performance devices which means that every manufacturer that provides device processors that are used for motion control in the EtherNet/IP based system would have to provide the high speed processors. Here, where a particular manufacturer routinely purchases system components including device processors from four suppliers and one or more of the suppliers do not provide the higher performance processors, the manufacturer would likely perceive the EtherNet/IP based system as unsupported by the industry and could forego adoption thereof.

Thus, there is a need for systems and methods that allow EtherNet/IP to be used to communicate from a PLC to standard distributed device processors where motion I/O connection processing times meet short time requirements so that EtherNet/IP can be used effectively in motion control applications.

BRIEF SUMMARY OF THE INVENTION

It has been recognized that the software stack that is typically maintained by a motion drive CPU may instead be implemented in a hardware based network accelerator that includes its own processor to speed up CIP communications between a motion controller and a motion drive. Here, the accelerator can receive Ethernet/IP packets, parse the packets to access CIP data, parse the CIP data to generate application data, store the application data in mailboxes accessible by a host CPU and then provide interrupts to the host CPU to indicate that data is waiting for the CPU in the mailboxes. When the host CPU has data to transmit to the motion controller, the host CPU can store the data in the mailboxes and provide a message to the accelerator that the accelerator processor should take over the transmission process. Thereafter the accelerator can retrieve the mail box data, form an Ethernet/IP packet including the data and transmit the data to the motion controller. The accelerator reduces computational burden on the host CPU and provides additional processing power for network communications so that the communication processes is sped up appreciably.

Consistent with the above comments, at least some embodiments of the disclosure include an apparatus for accelerating communications over the Ethernet between a first processor and a second processor where the communications include CIP messages, the apparatus comprising a network accelerator that includes memory locations, the accelerator associated with the first processor and programmed to, when the second processor transmits a data packet to the first processor over the Ethernet: intercept the data packet at a first processor end of the Ethernet, extract a CIP message from the data packet, parse the CIP message to generate received data, store the received data in the memory locations and provide a signal to the first processor indicating that data for the first processor in stored in the memory locations.

In some cases the data packet transmitted by the second processor is embedded in a packet frame including address information indicating a target processor to receive the data packet, the accelerator further programmed to, when the data packet is intercepted, use the frame data to identify the target processor, the accelerator only performing steps (b) through (e) when the first processor is the target processor. In some embodiments the communications between the second and first processors are EtherNet/IP packet communications. In some embodiments the network accelerator includes at least a portion of a field programmable gate array.

In some embodiments the network accelerator includes TCP/IP control logic that extracts the CIP message from the EtherNet/IP packet. In some cases the network accelerator includes an embedded CPU that parses the CIP message and stores the received data in the memory locations. In some cases the network accelerator provides an interrupt signal to the first processor after data is stored in the memory locations.

In some cases the memory locations include dual port shared buffers and wherein, after the first processor generates data to be transmitted to the second processor, the network accelerator receives a signal from the first processor indicating that the generated data is in the dual port shared buffers, retrieves the data from the dual port shared buffers and transmits the retrieved data to the second processor. In some embodiments the network accelerator is also programmed to, after retrieving the data from the dual port shared buffers, place the data in a CIP message packet and embed the CIP message packet into an EtherNet/IP packet and transmit the EtherNet/IP packet to the second processor.

In some embodiments the shared buffers include at least first and second different classes of shared buffers and wherein different priority data is stored in the different classes of shared buffers. In some cases the shared buffers include first, second, third and fourth mailboxes for four different classes of data including cyclic data, event data, service data and explicit data, respectively Other embodiments include an apparatus for accelerating communications between a first processor and a second processor, the apparatus comprising a network accelerator that is associated with the first processor and that is programmed to, when the first processor generates data to be transmitted to the second processor (a) receive a signal from the first processor indicating that data has been placed in a memory location, (b) retrieve the data from the memory location, (c) place the retrieved data in a CIP message packet, (d) embed the CIP message packet into a packet frame to generate a framed packet and (e) transmit the framed packet to the second processor via the Ethernet.

In some cases the packet frame includes an Ethernet/IP frame. In some embodiments the Ethernet/IP frame includes transport frame, a network frame and an Ethernet frame. In some cases the memory location includes a plurality of dual port shared buffers and wherein, after the second processor transmits data to the first processor, the network accelerator intercepts the transmitted data, parses the data to identify CIP data, stores the CIP data in the dual port shared buffers and provides a signal to the first processor that the CIP data has been stored in the dual port shared buffers.

Other embodiments include a method for accelerating communications over the Ethernet between a first processor and a second processor where the communications include CIP messages, the method comprising the steps of providing a network accelerator that includes memory locations, when the second processor transmits a data packet to the first processor over the Ethernet: (a) using the accelerator to intercept the data packet at a first processor end of the Ethernet, (b) using the accelerator to extract a CIP message from the data packet, (c) using the accelerator to parse the CIP message to generate received data, (d) using the accelerator store the received data in the memory locations; and (e) using the accelerator provide a signal to the first processor indicating that data for the first processor in stored in the memory locations.

In some cases the data packet transmitted by the second processor is embedded in a packet frame including address information indicating a target processor to receive the data packet, the method further including the steps of using the accelerator to, when the data packet is intercepted, use the frame data to identify the target processor, the accelerator only performing steps (b) through (e) when the first processor is the target processor. In some embodiments the communications between the second and first processors are EtherNet/IP packet communications.

In some cases the memory locations include dual port shared buffers and wherein, after the first processor generates data to be transmitted to the second processor, the method further includes receiving a signal from the first processor indicating that the generated data is in the dual port shared buffers and using the accelerator to retrieve the data from the dual port shared buffers and transmit the retrieved data to the second processor.

Other embodiments include a method for accelerating communications between a first processor and a second processor, the method comprising the steps of providing a network accelerator that is associated with the first processor, when the first processor generates data to be transmitted to the second processor: (a) receiving a signal at the accelerator from the first processor indicating that data has been placed in a memory location, (b) using the accelerator to retrieve the data from the memory location, (c) using the accelerator to place the retrieved data in a CIP message packet, (d) using the accelerator to embed the CIP message packet into a packet frame to generate a framed packet and (e) using the accelerator to transmit the framed packet to the second processor via the Ethernet. In some embodiments the packet frame includes an Ethernet/IP frame.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE DISCLOSURE

The various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 1:
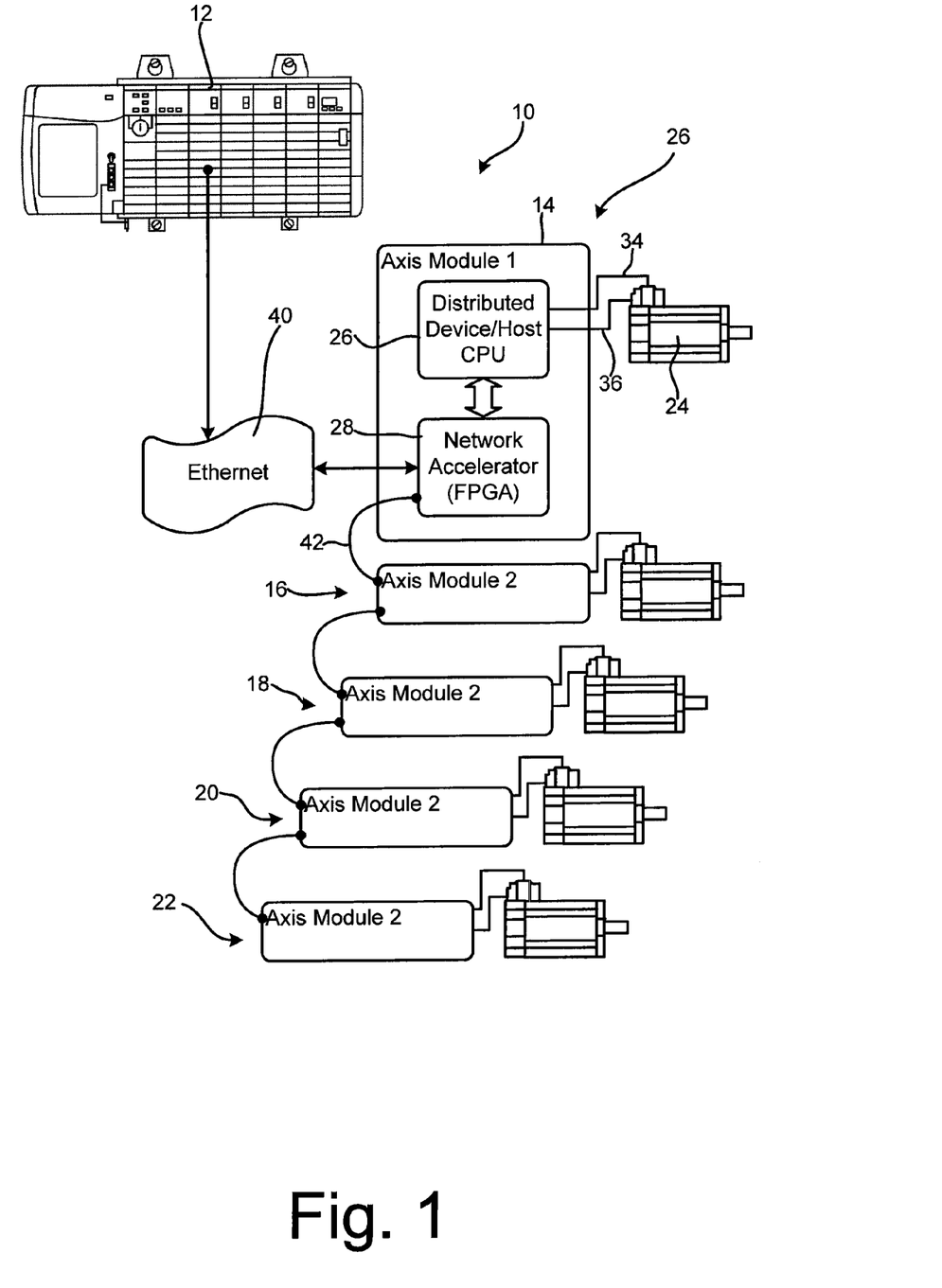
FIG. 1 is a schematic diagram illustrating an exemplary CIP motion network including a motion controller and CIP motion drives or access modules.

Referring now to the drawings wherein like reference numerals correspond to similar elements through the several views and, more specifically, referring to FIG. 1, the present invention will be described in the context of an exemplary CIP motion network including a motion controller 12 and CIP motion drives or access modules 14, 16, 18, 20 and 22. Each of the access modules 14, 16, 18, 20 and 22 is linked to a separate motor via power lines for controlling motor operation and via feedback lines for receiving feedback signals from the motor. Each of the access module/motor combinations is similar in construction and operation and therefore, in the interest of simplifying this explanation, only module 14 and its associated motor 24 will be described here in any detail. In FIG. 1, the motor power lines linking access module 14 to motor 24 are collectively identified by numeral 34. The feedback line or lines linking motor 24 to module 14 are represented by numeral 36.

Referring still to FIG. 1, access module 14 includes, among other components, a distributed device/host central processing unit (CPU) 26 which, as the label implies, processes data related to operation of motor 24 including feedback data on lines 36 and other command or control information to be described hereafter and controls the motor 24 via power on lines 34. For example, CPU 26 or the processor associated therewith may control motor speed, acceleration or deceleration rate, motor torque, etc.

Referring still to FIG. 1, controller 12 is a programmable logic controller (PLC) that executes one or more control programs or routines in order to track process variables or inputs representative of the status of the controlled motors (e.g., 24 in FIG. 1) and to generate outputs for controlling those motors. Controller 12 communicates with access modules 14, 16, 18, 20 and 22 via Ethernet 40. To this end, referring to FIG. 2, the standard Ethernet/IP model for communication divides tasks between five different layers including a physical layer 40, a data link layer 42, a network layer 44, a transport layer 46 and an application layer 48. The five layers and tasks associated therewith are well known in the art and therefore, will not be described here in detail. Instead, brief explanations of each layer are provided here.

Figure 2:
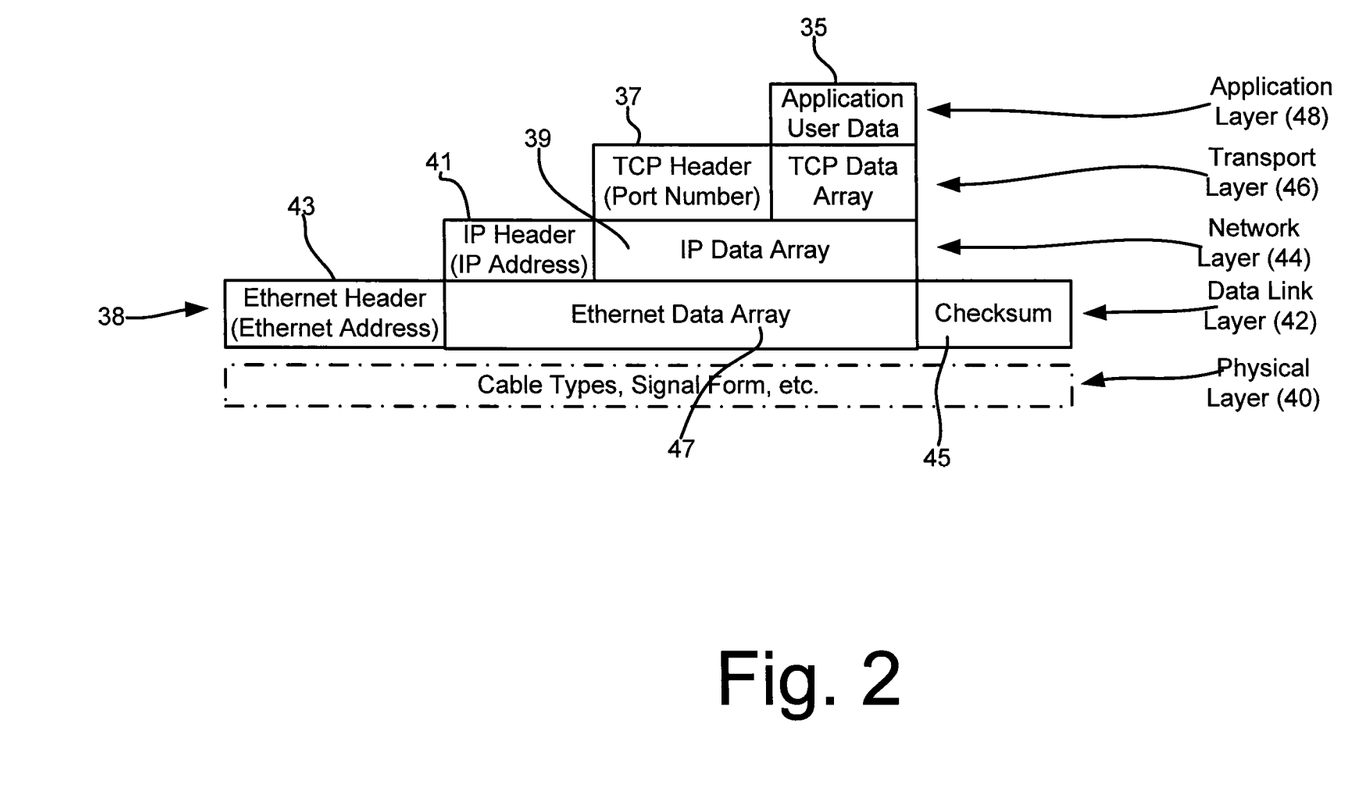
FIG. 2 is an international standards organization-open systems interconnection model that is used by the system shown in FIG. 1 to facilitate communication between the controller and the access modules illustrated.

Physical layer 40 defines the physical transmission characteristics of the network used for communication and, to that end, defines electrical, mechanical, functional and procedural attributes used to access and send data streams over a physical medium. Data link layer 42 is responsible for insuring reliable delivery at the lowest levels, including data frame, air detection and correction, sequence control and flow control. Ethernet and medium access control (MAC) are defined at this level. Network layer 44 controls routing, prioritization, set up, release of connections and flow control and establishes/maintains connections over a network and provides addressing, routing, and delivery of packets to hosts. The internet protocol is supported by this level. Transport layer 46 controls sequencing of application data, controls the start and end of transmissions, provides error detection, correction, end-to-end recovery and clearing. This level also provides software flow of data between networks and the TCP and UDP are supported by this level. Application layer 48 is used by software applications to prepare and interpret data for use by the other four layers therebelow. The application provides an application interface to the network and, for the purposes of this explanation, CIP is supported by this layer.

Referring still to FIG. 2, construction of an Ethernet/IP packet 38 for transmission is illustrated. When an application sends its data over the Ethernet 40 (see again FIG. 1), the data is passed down through each layer illustrated and upper layer information is wrapped into data bytes of the next lowest layer via encapsulation. Each subsequent layer has a designated function and attaches its own protocol header to the front of its packet. Thus, for example, the application user data 35 in FIG. 2 is wrapped in a TCP header 37 at the transport layer 46. Similarly, the transport layer data including the application user data 35 and the TCP header 37 forms an IP data array 39 to which the network layer 44 adds an IP header 41 and data link layer 42 adds an Ethernet header 43 and a checksum 45 to an Ethernet data array 47 which comprises the IP header 41 and the IP data array 39. The lowest layer, the physical layer, is responsible for actually sending the data to a target address or processor. The entire process described here is reversed when data is received at a processor or device. In other words, a received Ethernet/IP packet is unwrapped at each level and passed up to the receiver's application layer where the application data can then be used by the CPU or the like.

To illustrate, referring again to FIGS. 1 and 2, a host application that may be run by controller 12 may form a request or command to be transmitted to access module 14. The command is passed as application user data 35 from the application run by controller 12 to the transport layer 46, network layer 44 and data link layer 42, which each adds its own control information to the packet in the form of protocol headers and footers. When the packet reaches physical layer 40, the physical layer electronically transmits the packet to access module 14. When module 14 receives the packet, the packet travels up through the different layers at module 14 with each layer decoding its portion of the message and removing the header and footer that was attached by the same layer at controller 12. Finally the packet reaches the destination application. Although each layer only communicates with the layer just above or just below it, this process can be viewed as one layer at one end of a communication path communicating with its partner layer at the opposite end.

Referring once again to FIG. 1, consistent with at least some aspects of the present invention, in addition to including distributed device/host CPU 26, access module 14 also includes a hardware based network accelerator 28. As the label implies, network accelerator 28 operates to accelerate network communications between controller 12 and the hosts CPU 26. To this end, referring to FIG. 3, exemplary network accelerator 28 includes a media access controller (MAC) 54, a switch 53, TCP/IP-UDP control logic that forms a filter engine 56, a receive buffer 58, a transmit buffer 60, an embedded accelerator CPU or processor 62, dual port buffer/mail box 64 and host interface logic 72. Accelerator 28 receives Ethernet/IP data packets from controller 12 via ports 50 and 52, extracts the application user data (e.g., the CPI data) from the packets and provides that data to host CPU 26 via host interface logic 24. In addition, when host CPU 26 has data to transfer or transmit to controller 12, accelerator 28 receives that data, forms Ethernet/IP data packets and then transmits the Ethernet/IP data packets to controller 12 via Ethernet 40. More specifically, data received at ports 50 and/or 52 is provided to switch 53. Switch 53 enables daisy chains of CIP motion drives or axis modules as shown in FIG. 1. Switch 53 only passes messages addressed to the IP address of an axis to upper layers of the axis and passes other messages back out ports 50, 52 to other daisy chained axis modules. In at least some embodiments switch 53 supports cut through forwarding for minimal latencies in forwarding and store and forward policy in case of network contention. In at least some embodiments IEEE-1588 time synchronization hardware (not shown) assists time stamping of incoming and outgoing messages and facilities time coordinated motion across several axis modules that may form a motion group. Here, in at least some cases, all CIP motion drives in a motion group may be synchronized to a grand master clock that resides in controller 12. MAC 54 passes data from the switch 53 on to filter engine 56. Engine 56 extracts the application user data or CIP data or message from the Ethernet/IP data packet and copies the CIP data into local receive buffer 58. Filter engine 56 is a hardware implementation of the software TCP/IP and TCP/UDP protocol stacks. Here, in at least some embodiments, multi-cycle state machines can be designed to realize the hardware circuits.

Figure 3:
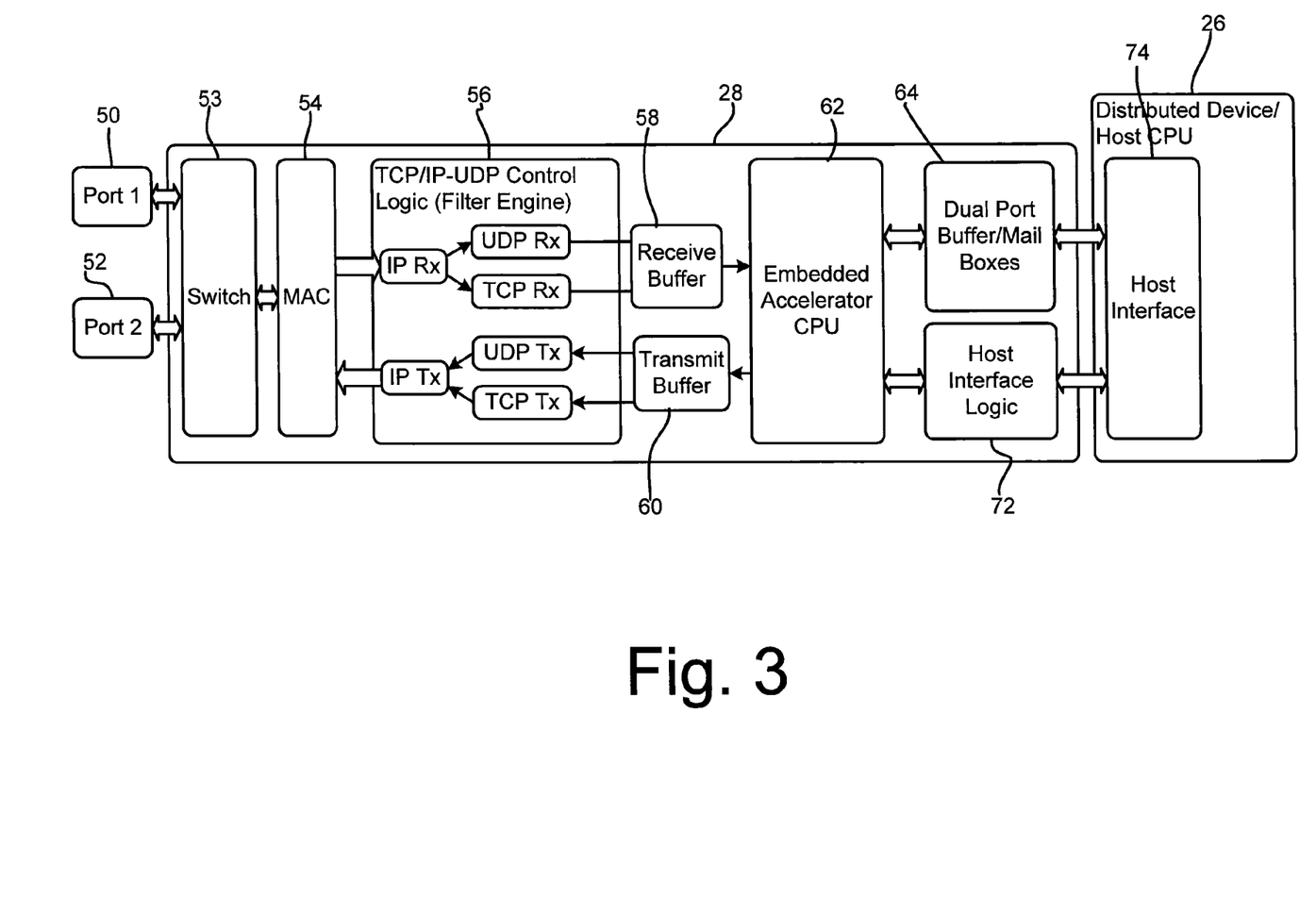
FIG. 3 is a schematic illustrating a CIP network accelerator that is consistent with at least some embodiments of the present disclosure.

Next, embedded accelerator CPU 62 parses the CIP message and stores the parsed data in dual port buffer 64. Host interface logic 72 then provides an interrupt to host CPU 74 to indicate that data is waiting for the host CPU in the dual port buffer 64.

Referring still to FIG. 3, when host CPU 26 consumes the data in buffer 64 and is ready to transmit a reply or to transmit other data to controller 12, CPU 26 copies the data to be transmitted to the dual port buffer 64 and indicates, via host interface logic 74, that CPU 62 should take over the transmission task. Thereafter, CPU 62 retrieves the data from dual port buffer 64, formats that data into a CIP message format, and places the CIP data packet in transmit buffer 60. Next, filter engine 56 forms an Ethernet/IP data packet using the packets in transmit buffer 64 where the Ethernet/IP packet has the form described above with respect to FIG. 2. The Ethernet/IP data packet is provided to MAC 54 and is eventually transmitted to controller 12 via physical layer 40 (see again FIG. 2).

Figure 4:
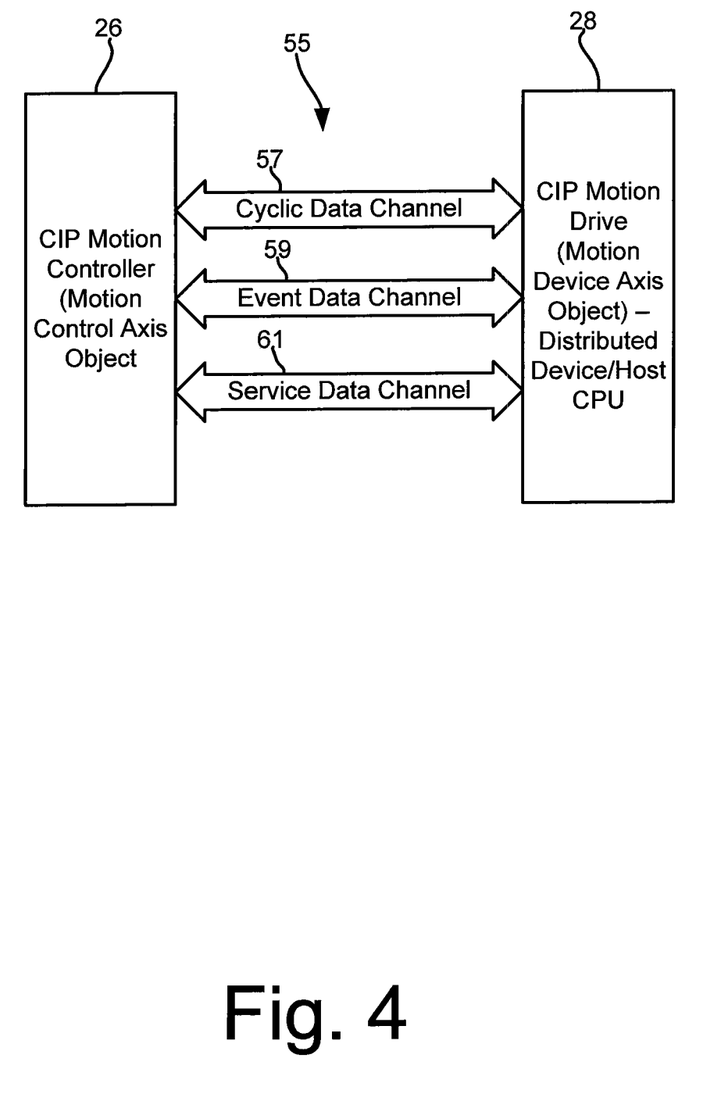
FIG. 4 is a schematic illustrating a CIP motion I/O connection format.

Referring now to FIG. 4, a CIP motion I/O connection 55 is illustrated where controller-to-device and device-to-controller connections are used to transfer data between the CIP motion controller 26 and the motion drive or host CPU 28. The I/O messages use UDP transport for faster service and, to this end, exemplary controller-to-device messages may carry the following data. First, controller-to-device messages may include cyclic data 57 which, as the label implies, carries cyclic data blocks that are sampled or calculated every controller update period and synchronized with other nodes or devices in the motion control system through the use of distributed system time. This type of data needs to be processed immediately and used by the drive or host CPU within one device update period. Second, the controller-to-device messages may include event data 59 which carries event data associated with drive events such as registration, homing, etc. Event data is medium priority and therefore must be processed by the host CPU and applied within one controller update period. Third, the controller-to-device messages may include service data 61 that carries data associated with service request to read or write attribute values of the motion device axis object as part of on-line configuration and diagnostic functionality as well as service requests to effect motion device axis object behavior as part of controller instruction execution. Service data has the lowest priority and is typically buffered and processed as a background task by the host CPU.

Referring now to FIG. 4, an exemplary dual port buffer 64 is illustrated that includes mailboxes 0, 1, 2 and 3 that are labeled 120, 122, 124 and 126, respectively. The mailboxes 120, 122 and 124, in at least some exemplary embodiments, are used for I/O messages including the cyclic data 57, event date 59 and service data 61. Mailbox 126 is used to store explicit messages (i.e., messages that require a response from another device). These dual port shared mailboxes can be accessed by both the embedded CPU 62 (see again FIG. 3) and the host CPU 26 (see FIG. 1). To avoid contention over the mailboxes, the host interface logic 72 and/or logic 74 may include built in arbitration logic.

Figure 5:
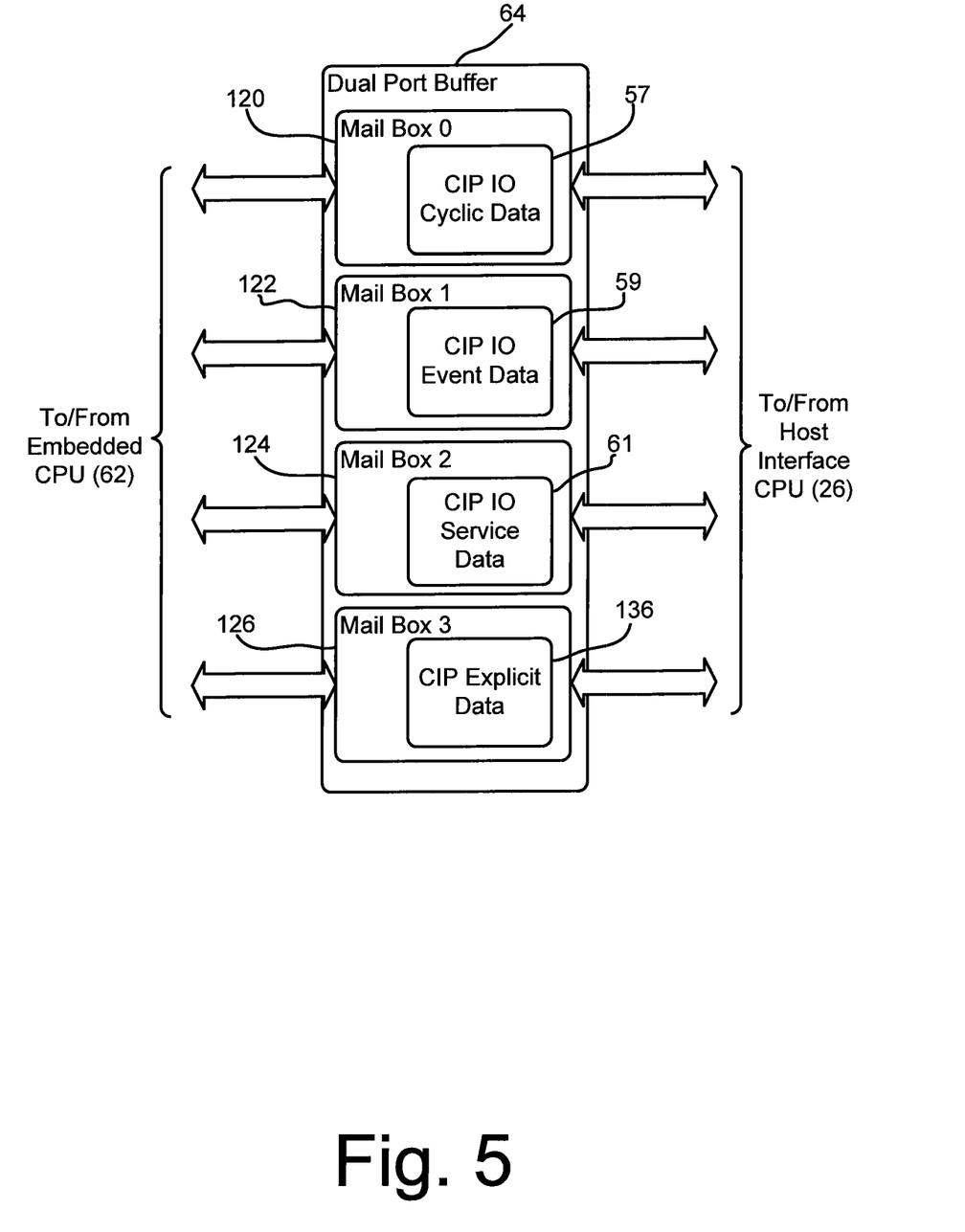
FIG. 5 is a schematic illustrating an exemplary dual port buffer that is consistent with at least some aspects of the present disclosure.
Figure 6:
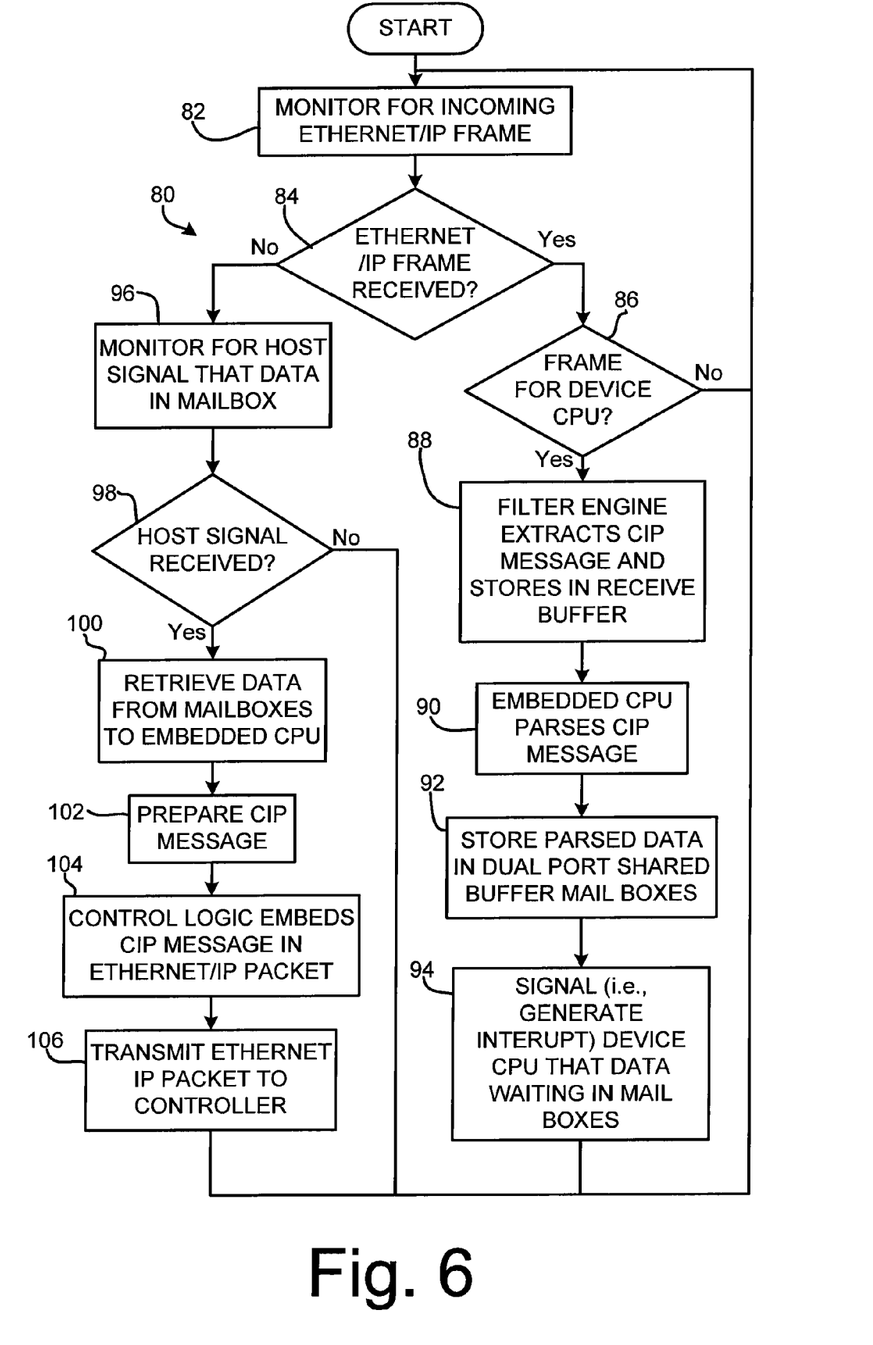
FIG. 6 is a flow chart illustrating a method that may be performed by the network accelerator shown in FIG. 3.

Referring now to FIG. 5, a method 80 that may be performed by the network accelerator 28 described above with respect to FIGS. 1, 3 and 4 is illustrated. At process block 82, MAC 54 in FIG. 3 monitors ports 50 and 52 for incoming Ethernet/IP frames. At decision block 84, where an Ethernet/IP frame is received, control passes to block 86 where MAC 54 determines whether or not the frame targets host CPU 26. Where the frame does not target host CPU 26, control passes back up to block 82 where the loop including blocks 82 and 84 continues. At block 86, where the Ethernet/IP frame targets host CPU 26, control passes to block 88 where filter engine 56 extracts CIP application data and stores that data in receive buffer 58. At block 90, embedded CPU 62 parses the CIP message and stores the parsed data in dual port shared buffer mailboxes 120, 122, 124 and 126 (see specifically FIG. 4). At block 94, CPU 62 works through host interface logic 72 to provide an interrupt signal to host CPU 26 indicating that data for the host CPU 26 is stored in the dual port buffer 64. After block 94, control passes to back up to block 82.

Referring still to FIG. 5, at block 84, where no Ethernet/IP frame is received, control passes down to block 96. At block 96, CPU 62 monitors for a signal from the host CPU 26 that data has been stored or copied into dual port buffer 64. Where no host signal is received at block 98, control passes back up to block 82 where the process including blocks 82 and 84 continues. At block 98, once a signal is received from host CPU 26, control passes to block 100 where CPU 62 retrieves data from dual port buffer 64. At block 102, CPU 62 prepares a CIP message including the data retrieved from port buffer 64. At process block 104, filter engine 56 embeds the CIP message in an Ethernet/IP data packet and at block 106 MAC 54 transmit the Ethernet/IP data packet to controller 12.

At this point it should be appreciated that the hardware based network accelerator 28 allows the flexibility needed in architecting a wide range of CIP motion drives. The accelerator offers an improvement in the overall performance of a CIP motion network by reducing latencies in the drive. The accelerator enables shorter connection update rates.

While accelerator 28 may be constructed in various ways, one advantageous configuration includes a field programmable gate array (FPGA) that includes hardware that has fast internal memories, PLLs/DLLs, arithmetic circuits and even serial transceivers. These hardware resources coupled with re-configurable logic makes FPGAs suitable for implementing an embedded network accelerator. In order to overcome the pitfalls of prior systems that required the host CPU 26 to maintain and operate a software stack process, the hardware filter engine 56 is used at the transport and network layer 46 and 44, respectively (see again FIG. 2). Software processing may still be used at the higher levels to retain flexibility and adaptability to protocol changes. FPGA based design allows easy adaption to changes in the network protocols in the future.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims. For example, in some embodiments the physical layer transceivers may be combined into an FPGA. In addition, an FPGA may be provided with an external fast memory for temporary data storage.

To apprise the public of the scope of this invention, the following claims are made:

1. An apparatus for accelerating communications over the Ethernet between a first processor and a second processor where the communications include CIP messages, the apparatus comprising:
   a network accelerator that includes memory locations, the network accelerator in communication with the first processor and the second processor and programmed to, when the second processor transmits a data packet to the first processor over the Ethernet:
   (a) intercept the data packet at a first processor end of the Ethernet;
   (b) extract a CIP message from the data packet;
   (c) parse the CIP message to generate application specific data;
   (d) store the application specific data in the memory locations; and
   (e) provide a signal to the first processor indicating that the application specific data for the first processor is stored in the memory locations;
   wherein the memory locations include dual port shared buffers, the dual port shared buffers include at least first and second different classes of shared buffers, and different priority data is stored in the at least first and second different classes of shared buffers;
   the first processor to access the application specific data in the dual port shared buffers after receiving the signal from the network accelerator indicating that the application specific data for the first processor is stored in the dual port shared buffers, the first processor to then generate data to be transmitted to the second processor and stores the generated data in the dual port shared buffers, the shared buffers further including at least three mailboxes, the at least three mailboxes for storing at least three data classes, the at least three data classes selected from at least three of cyclic data, event data, service data and explicit data; and
   the network accelerator to receive a signal from the first processor indicating that the generated data is in the dual port shared buffers, the network accelerator to then retrieve the generated data from the dual port shared buffers and transmit the generated data to the second processor.

2. The apparatus of claim 1 wherein the network accelerator is also programmed to, after retrieving the generated data from the dual port shared buffers, place the generated data in a CIP message packet and embed the CIP message packet into an EtherNet/IP packet and transmit the EtherNet/IP packet to the second processor.

3. The apparatus of claim 1 wherein the shared buffers include first, second, third and fourth mailboxes for four different classes of data including cyclic data, event data, service data and explicit data, respectively.

4. A method for accelerating communications over the Ethernet between a first processor and a second processor where the communications include CIP messages, the method comprising the steps of:
   providing a network accelerator that includes memory locations;
   when the second processor transmits a data packet to the first processor over the Ethernet:
   (a) using the accelerator to intercept the data packet at a first processor end of the Ethernet;
   (b) using the accelerator to extract a CIP message from the data packet;
   (c) using the accelerator to parse the CIP message to generate application specific data;
   (d) using the accelerator to store the application specific data in the memory locations; and
   (e) using the accelerator to provide a signal to the first processor indicating that the application specific data for the first processor is stored in the memory locations;
   wherein the memory locations include dual port shared buffers, the dual port shared buffers including at least first and second different classes of shared buffers, and different priority data is stored in the at least first and second different classes of shared buffers, the shared buffers further including at least three mailboxes, the at least three mailboxes for storing at least three data classes, the at least three data classes selected from at least three of cyclic data, event data, service data and explicit data;
   the first processor accessing the application specific data in the dual port shared buffers after receiving the signal from the network accelerator indicating that the application specific data for the first processor is stored in the dual port shared buffers; and the first processor generating data to be transmitted to the second processor, the method further includes using the accelerator for receiving a signal from the first processor indicating that the generated data is in the dual port shared buffers and using the accelerator for retrieving the data from the dual port shared buffers and transmitting the generated data to the second processor.

5. The method of claim 4 wherein the data packet transmitted by the second processor is embedded in a packet frame including address information indicating a target processor to receive the data packet, the method further including the steps of using the network accelerator to, when the data packet is intercepted, use the frame data to identify the target processor, the accelerator only performing steps (b) through (e) when the first processor is the target processor.

6. The method of claim 5 wherein the communications between the second processor and first processor are EtherNet/IP packet communications.

7. The method of claim 4 further comprising the steps of:
when the first processor generates data to be transmitted to the second processor:
(a) receiving a signal at a network accelerator associated with the first processor, the accelerator receiving the signal from the first processor indicating that data has been placed in the dual port shared buffers;
(b) using the accelerator to retrieve the data from the dual port shared buffers;
(c) using the accelerator to place the retrieved data in a CIP message packet;
(d) using the accelerator to embed the CIP message packet into a packet frame to generate a framed packet; and
(e) using the accelerator to transmit the framed packet to the second processor via the Ethernet.

8. The method of claim 7 wherein the packet frame includes an Ethernet/IP frame.

9. The method of claim 4 wherein the application specific data comprises at least one of cyclic data, event data, and service data.

* * * * *